US011633037B2

(12) United States Patent
Eben

(10) Patent No.: US 11,633,037 B2
(45) Date of Patent: Apr. 25, 2023

(54) HEAD FOR AN ORAL CARE IMPLEMENT AND ORAL CARE IMPLEMENT

(71) Applicant: The Procter & Gamble Company, Cincinnati, OH (US)

(72) Inventor: Kerstin Sarina Eben, Mainz (DE)

(73) Assignee: The Procter & Gamble Company, Cincinnati, OH (US)

( * ) Notice: Subject to any disclaimer, the term of this patent is extended or adjusted under 35 U.S.C. 154(b) by 131 days.

(21) Appl. No.: 16/887,958

(22) Filed: May 29, 2020

(65) Prior Publication Data
US 2020/0383466 A1 Dec. 10, 2020

(30) Foreign Application Priority Data

Jun. 5, 2019 (EP) .................................. 19178404

(51) Int. Cl.
A46B 15/00 (2006.01)
A46B 9/04 (2006.01)
A46B 9/06 (2006.01)
A46D 1/00 (2006.01)
A46B 13/00 (2006.01)
A46B 13/02 (2006.01)
A61C 1/00 (2006.01)
A61C 17/22 (2006.01)

(52) U.S. Cl.
CPC .............. A46B 15/001 (2013.01); A46B 9/04 (2013.01); A46B 9/06 (2013.01); A46D 1/023 (2013.01); A46D 1/0207 (2013.01); A46B 13/001 (2013.01); A46B 13/02 (2013.01); A46B 2200/1066 (2013.01); A61C 17/22 (2013.01)

(58) Field of Classification Search
CPC . A46B 15/001; A46B 9/04; A46B 2200/1066; A46D 1/023; A46D 1/0207
See application file for complete search history.

(56) References Cited

U.S. PATENT DOCUMENTS 4,802,255 A 2/1989 Breuer
5,268,005 A 12/1993 Suhonen
(Continued)

FOREIGN PATENT DOCUMENTS

CN 1097969 A 2/1995
CN 106488724 A 3/2017
(Continued)

OTHER PUBLICATIONS

Computer generated English translation of JP 2005-103184 A to Endo, Apr. 2005. (Year: 2005).*
(Continued)

Primary Examiner — Laura C Guidotti
(74) Attorney, Agent, or Firm — Vladimir Vitenberg

(57) ABSTRACT

A head for an oral care implement comprises a number of colored filaments of different types. The filaments extend from a mounting surface of the head and are grouped together to define an initial color pattern. At least two types of filament have staggered time-controlled color changing properties, wherein each of said type of filament changes its color within pre-defined time periods, the pre-defined time periods being different from each other so that the initial color pattern changes color characteristics over at least a first pre-defined period of time to a first color pattern and over a subsequent second pre-defined period of time to a second color pattern, the second pattern being different from the first pattern.

13 Claims, 3 Drawing Sheets

(56) References Cited

U.S. PATENT DOCUMENTS

| | | | |
|---|---|---|---|
| 5,313,909 A | 5/1994 | Tseng | |
| 8,448,286 B2 * | 5/2013 | Driesen | A46B 15/001 428/397 |
| 2003/0044604 A1 | 3/2003 | Weihrauch | |
| 2010/0293734 A1 | 11/2010 | Driesen | |
| 2014/0339395 A1 | 11/2014 | Kumpf et al. | |
| 2015/0130259 A1 | 5/2015 | Birk | |
| 2016/0015163 A1 | 1/2016 | Newman | |
| 2019/0014898 A1 | 1/2019 | Newman | |
| 2020/0383467 A1 | 12/2020 | Eben | |
| 2021/0052063 A1 | 2/2021 | Birk et al. | |

FOREIGN PATENT DOCUMENTS

| | | | | |
|---|---|---|---|---|
| DE | 1209276 B | | 1/1966 | |
| JP | H0361516 A | | 3/1991 | |
| JP | H09174570 A | | 7/1997 | |
| JP | 2001178542 | | 7/2001 | |
| JP | 2005-103184 A | * | 4/2005 | ............... A46D 1/00 |
| JP | 2010233781 A | | 10/2010 | |
| WO | 2011052274 A1 | | 5/2011 | |
| WO | 2016131197 A1 | | 8/2016 | |
| WO | WO2017179812 | | 10/2017 | |

OTHER PUBLICATIONS

All Office Actions, U.S. Appl. No. 16/888,091.
All Office Actions, U.S. Appl. No. 16/997,566.
CM05097Q PCT Search Report and Written Opinion for PCT PCT/US2020/070119 dated Aug. 25, 2020.
Extended European Search Report and Search Opinion; Application Ser. No. 19178404.0; dated Oct. 22, 2019; 9 pages.

* cited by examiner

HEAD FOR AN ORAL CARE IMPLEMENT AND ORAL CARE IMPLEMENT

FIELD OF THE INVENTION

The present disclosure is concerned with a head for an oral care implement, the head comprising a number of colored filaments of different types, the filaments extending from a mounting surface of the head and being grouped together to define an initial color pattern. The present disclosure is further concerned with an oral care implement comprising such head.

BACKGROUND OF THE INVENTION

Tufts composed of a plurality of filaments for oral care implements, like manual and powered toothbrushes, are well known in the art. Generally, the filaments are attached to a mounting surface of a head intended for insertion into a user's oral cavity. A grip handle is usually attached to the head, which handle is held by the user during brushing. The head is either permanently connected or repeatedly attachable to and detachable from the handle.

Brushing the teeth is known to be the most effective way to maintain oral hygiene. In order to clean teeth effectively and to achieve good cleaning results, filaments attached to the head of a toothbrush must be able to disrupt plaque from the teeth and take it away. However, the cleaning effectiveness of a toothbrush depends on factors such as brushing habits of the user, frequency, intensity and duration of brushing. Further, there are several features providing a toothbrush with specific cleaning characteristic to achieve maximized cleaning effectiveness. These features include material, size, shape, strength and resiliency of the brush filament and the length, width and overall shape and area of the brushing surface. Other features affecting the cleaning effectiveness of a toothbrush include the number of tufts (bundles of individual filaments), the number of rows of tufts and the arrangement of the tufts on the brush head. However, there is general agreement in the art that wear is a crucial factor, which can dramatically diminish the effectiveness of a toothbrush in maintaining oral hygiene. For example, the art recognizes and acknowledges that diminished effectiveness of a toothbrush by wear can result in increased plaque accumulation and increased risks to periodontium tissue. Further, worn out filaments can damage teeth and gums.

The degree of wear of a toothbrush is primarily a function of the properties of the filament and the mechanical force applied to the filaments during brushing. The degree of wear can also be accelerated to some extent by abrasive materials normally contained in dentifrices. Brush wear results in tearing, splaying, expansion and fraying of the filaments and a decrease in strength and resiliency of the filaments which is manifested by single filaments deviating from their original direction. Moreover, wear is manifested by a change in the overall shape and size of the brushing surface area and by changes in the texture of the filament. While toothbrush wear varies from user to user, studies indicate that a toothbrush commonly used has a useful effective life of from about eight to twelve weeks. Thereafter, wear causes sufficient deterioration of the filaments to warrant replacement of the brush in order to assure continued maintenance of effective oral hygiene.

Unfortunately, toothbrushes are not usually replaced regularly and oftentimes are used far beyond their effective useful life. As mentioned, the dental profession has recommended replacement of toothbrushes after about three months of use. However, annual toothbrush consumption figures indicate that toothbrush users replace their toothbrushes about once a year. The dental profession has made an earnest effort to educate the public about the need to assess the wear of a toothbrush being used to determine, if it should be discarded and replaced. However, these efforts have had limited success since the user has the responsibility to remember the condition of a toothbrush which should be discarded and to remember to monitor and continually assess the condition of the toothbrush. Accordingly, a more effective approach is needed to provide reliable means to signal or warn a toothbrush user when a toothbrush has become sufficiently affected by wear that it should be discarded and replaced.

It is an object of the present disclosure to provide a head for an oral care implement which overcomes at least one of the above-mentioned drawbacks. It is also an object of the present disclosure to provide an oral care implement comprising such head.

SUMMARY OF THE INVENTION

In accordance with one aspect, a head for an oral care implement is provided, the head comprising a number of colored filaments of different types, the filaments extending from a mounting surface of the head and being grouped together to define an initial color pattern, at least two types of filament having staggered time-controlled color changing properties, wherein each of said type of filament changes its color within pre-defined time periods, the pre-defined time periods being different from one another so that the initial color pattern changes color characteristics over at least a first pre-defined period of time to a first color pattern and over a subsequent second pre-defined period of time to a second color pattern, the second pattern being different from the first pattern.

In accordance with one aspect an oral care implement is provided that comprises such head, the head being preferably repeatedly attachable to and detachable from a handle.

BRIEF DESCRIPTION OF THE DRAWINGS

The invention is described in more detail below with reference to various embodiments and figures, wherein.

DETAILED DESCRIPTION OF THE INVENTION

Figure 1:
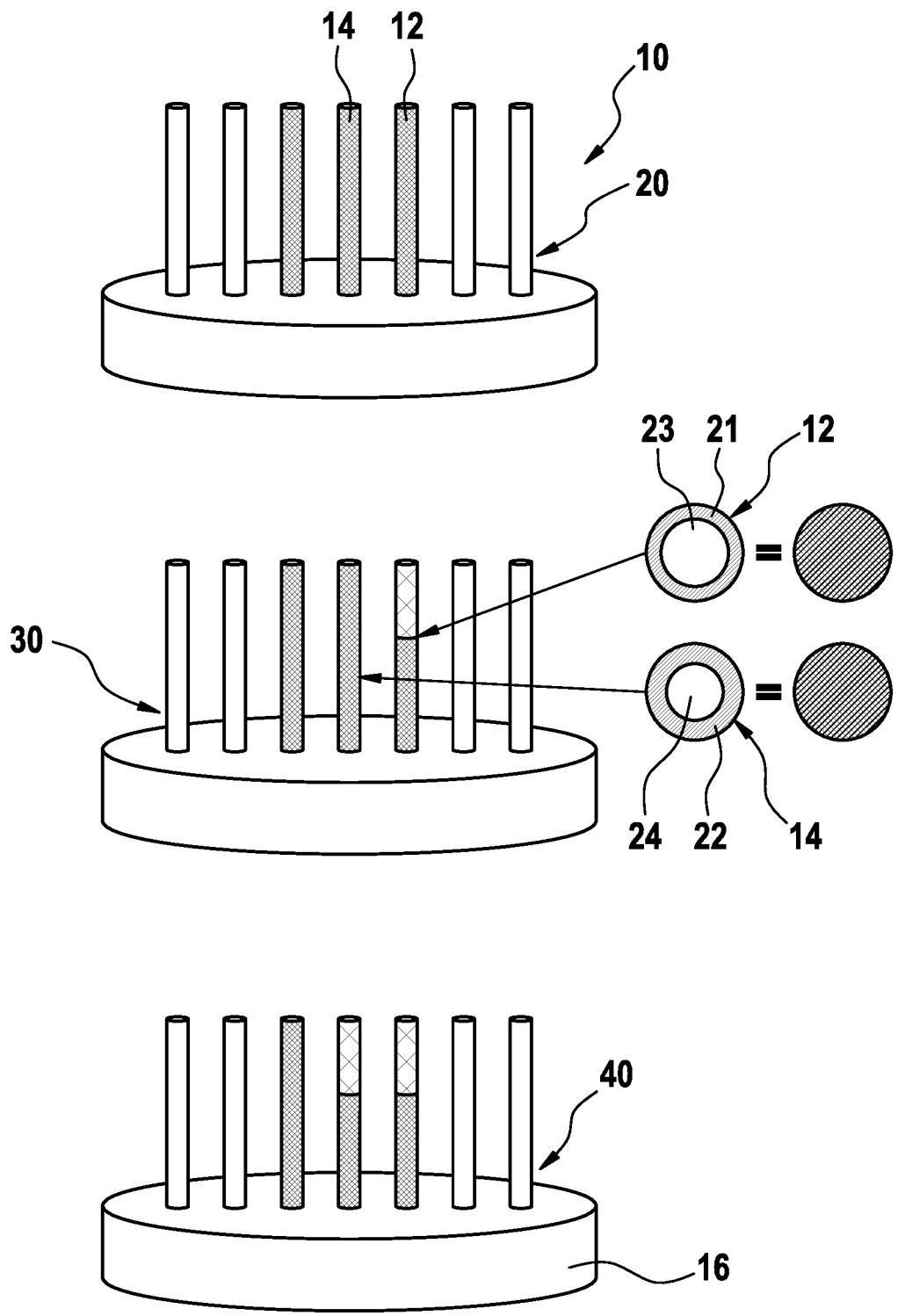
FIG. 1 shows in a schematic manner the staggered time-controlled color changing characteristics of a head according to an embodiment of the present disclosure, starting from an initial color pattern, changing to a first color pattern within a first pre-defined period of time, and to a second color pattern within a second pre-defined period of time.

The head for an oral care implement may have a circular shape in the form of a disk being suitable for refills for electrical toothbrushes, or, alternatively, may have a longitudinal length extension extending between a proximal end and a distal end, the distal end being opposite the proximal end. The proximal end is defined as being the end closest to the handle. The head may be permanently attached, or repeatedly attachable to and detachable from the handle.

The head comprises a number of colored filaments of different types. The filaments may be bundled together to form tufts of filaments which extend from a mounting surface of the head. The filaments or tufts of filaments are grouped together to define an initial color pattern, which may be uniform, i.e. it has the same overall color, or alternatively, the initial color pattern may comprise at least two different colors.

At least two types of filament have staggered time-controlled color changing properties, wherein each of said type of filament changes its color within pre-defined time periods. The pre-defined time period of a first type of filament is different from the pre-defined time period of a second type of filament so that the initial color pattern changes its color characteristics over at least a first pre-defined period of time to a first color pattern and over a second pre-defined period of time to a second color pattern, wherein the second pattern is different from the first pattern. Within a first period of time, the first type of filament changes its color, while the color of the second type of filament remains the same. In a subsequent second period of time (i.e. after the first period of time), the second type of filament changes its color, i.e. with respect to the first type of filament in a delayed or time-shifted manner As a result, the initial color pattern changes within a first time-interval to a first pattern being different from the initial pattern, and, again, the first pattern changes within the subsequent second time period to the second pattern, wherein the second pattern is different from the initial and first color pattern.

The initial color pattern may change gradually to the first color pattern within a time period of one or two months, while the first color pattern changes gradually to the second color pattern within a subsequent further month, i.e. after one/two months after the first color change happened, if the brush is used on a frequently bases, i.e. about twice per day.

Consequently, the filament arrangement according to the present disclosure is designed in a way that a user can visually detect a multi-step signal indicative of the toothbrush wear and replace the worn toothbrush at the right point in time (e.g. after three month of regular/frequent use). According to the present invention, the signal indicative of wear is provided by the use of filaments having the capability to undergo a change in color in response to wear. The second color pattern provides the user with the information that the head of the oral care implement, or the overall toothbrush has to be replaced immediately, while the first color pattern provides the user with a pre-warning that the brush has to get exchanged within the next forthcoming weeks.

If the first type of filament changes its color within the first period of time from an initial color to a second color to define the first color pattern, and a second type of filament changes its color after the first period of time and within the second period of time from an initial color to a second color to define the second color pattern, the first type of filament may further change its color within the second period of time from the second color to a third color to contribute to the second color pattern. This may provide a head for an oral care implement having even more visual impact and communicates to a user more clearly that the head or complete brush needs to get exchanged.

In addition to the first and second type of filaments, the head may comprise a third type of filament, the third type of filament may change its color after the first and second period of time within a subsequent third period of time from an initial color to a second color to define a third color pattern, the third color pattern being different from the first and second color pattern. The second color of the third type of filament may be different form the second color of the first and second type of filament.

For example, if the brush is used on a frequently bases, i.e. in average twice per day, the initial color pattern may change to the first color pattern gradually until the end of a time period of one month, the first pattern may change to the second pattern gradually until the end of a subsequent further month, while the second color pattern may change to the third color pattern gradually until the end of an even further subsequent month, i.e. three months after first use. Such head can visually communicate a further step of wear over the lifetime of a toothbrush. A user usually forgets easily when he started using a new toothbrush. However, if a clear signal is given every month over a brush's lifetime of three months in total, the user is enabled to track the loss of brushing effectiveness over time and gets an early reminder (e.g. two months in advance) when the brush has to be exchanged. A purchase decision can be taken right in advance.

The present head for an oral care implement is designed to provide means so that the user can visually detect a multi-step signal indicative of toothbrush wear and replace the worn oral care implement or just the head thereof. The signal indicative of wear is provided by the use of filaments having the capability to undergo a change in color in response to wear.

At least one type of filament may be a monofilament, preferably made from polyamide, comprising a water-soluble dye colorant, preferably a food dye, the dye leaching over at least one of the pre-defined periods of time in response to increased use of the filament, thereby changing the color from an initial color to a second and/or third color.

The dye may be provided in a colored outer region of the filament, the outer region extending inwardly into a portion of the filament's cross-sectional area for a distance equal from about 20% to about 40%, preferably from about 20% to about 30% of the radius of the filament. Such filament type may provide relatively slow color changing properties and may be used to contribute to the second color pattern.

The degree of dye penetration and the degree of dye fastness of a selected filament maybe coordinated with the wear characteristics of the filament so that the change in color provides a reliable indication of filament deterioration due to wear. In general, with nylon brush filaments, suitable coordination between the distance or degree of dye penetration and dye fastness and the filament's wear characteristics can be achieved, if the colored outer region has an average degree of dye penetration corresponding to the dimensions above.

The colored outer region is adapted to provide a visual signal indicative of wear in response to filament use. The filaments can be natural or synthetic materials. The colored region provides an initial color or color viewable to the user. As wear is produced by continuing use of the filaments, the of the colored region changes to a point which signals the user that the filament no longer provides the requisite performance characteristics for effectively performing its assigned function.

The colored outer region may provide an annular ring having a substantially uniform degree of penetration.

Accordingly, the colored outer region provides an initial color intensity or color which is predominant. In response to wear produced by progressive brushing, the initial color changes and after sufficient wear, the change in color signals the user that the filament is no longer effective.

The colored outer region may be provided by a ring dyeing process. In ring dyeing processes, the filament is contacted with a dye for a time sufficient to at least color the outer surface and to also penetrate into a portion of the cross-sectional area to provide a degree of dye penetration. Before dying, the filaments may be transparent, translucent of colored such as by dyes or pigments. Dyes for providing the colored outer region may be food dyes or certified food colorants. Representative suitable food dyes or colorants are FD&C Red No. 40, Erythrosine (FD&C Red No. 3), Brillant Blue FCF (FD&C Blue No. 1), indigotine (FD&C Blue No. 2), Tartrozine (FD&C Yellow No. 5), Sunset Yellow FCF (FD&C Yellow No. 6) and Fast Green FCF (FD&C Green No. 3). In dyeing nylon brush filaments, food dyes or colorants such as those mentioned above, may be used in the form of buffered aqueous solutions which include amounts of dye up to about 5 percent by weight or somewhat higher. Depending upon the amount of buffer, the pH of such aqueous dye solutions may range from about 1.3 to about 13 and preferably between about 3 to about 1.2. Suitable buffers may be potassium phosphate, sodium hydroxide, potassium carbonate, potassium borate and potassium hydroxide. Representative suitable concentrations of buffers can range between about 0.025 to about 0.2 moles per liter of the aqueous dye solutions.

Additionally, the monofilament may comprise an inner portion being provided with a dye colorant, as well, preferably a food dye. The dye colorant of the inner portion may be different from the dye colorant of the colored outer region.

Ring dyeing processes may also be employed to provide filaments in which the filament has three regions across the cross-sectional area, with each region having a different color. The filament may be prepared by first dyeing the filament with a dye of a selected color under conditions to provide a degree of dye penetration. Thereafter the filament is dyed with a dye of another selected color to provide another degree of dye penetration. The respective degrees of penetration can be adjusted so that the change in color signals the user that the toothbrush should be replaced, or so that the change in color of both regions signals the user that the toothbrush should be replaced. In such a filament the colored outermost region may have a low degree of penetration equivalent to less than about 5% of the cross-sectional area of the filament.

In addition to the above, at least another type of filament may be provided, said filament being a monofilament, preferably made from polyamide. Said filament may comprise a water-soluble dye colorant, preferably a food dye, the dye leaching over at least one of the pre-defined periods of time in response to increased use of the filament, thereby changing the color from an initial color to a second and/or third color, and the dye is provided in a colored outer region extending inwardly into a portion of the filament's cross-sectional area for a distance equal to about 20% or less, preferably equal to about 10% or less of the radius of the filament.

Such filament type corresponds to the filament discussed above, but may provide relatively quick color changing properties and may be used to contribute to the first color pattern.

The filament may also he dyed with combinations of dyes. Each dye may provide a color intensity having a different resistance to change in response to wear and use. For example, the filament may be dyed with two dyes in which one dye is more resistant to change in response to wear and use than the other. in this case, the color intensity will change in response to wear and use to provide a color intensity which will be predominantly provided by the more resistant dye. For example, a base material of the filament may be blue. A water-soluble indicator dye being less resistant than the base dye can be added to the base material. The indicator dye may be for example red, green, yellow, orange, purple. For example, if a yellow indicator dye is added to a blue base material, then the overall color impression is green. After a certain period of time the indicator dye fades away, e.g. because it is water-soluble, and the base material in blue becomes visible to provide a signal that the brush head has to be exchanged or exchanged soon.

The degree of correlation between filament wear and change in color may depend on various factors, including filament material, physical and chemical properties of the filament material as well as the selected dye (or dyes) and condition of dyeing. A desired degree of correlation between filament wear and change in color can be determined empirically by subjecting a selected filament material to various dyes and conditions of dyeing to establish the degree of dye penetration and dye fastness needed to provide the desired correlation. The preferred degree of correlation is the one in which the desired change in color will occur within one of the desired time periods (e.g. within one, two or three months) of average use by the average user.

Depending on the type of toothbrush were the filaments are utilized, e.g. on manual or electrical toothbrushes performing a rotational oscillation movement, the filaments can be exposed to different levels of stress. To accommodate the different levels of stress the filaments are exposed to, the dye or dye formulation, e.g. the dye concentration, can be adjusted accordingly.

Alternatively, or in addition to the above, at least one type of filament may be a core-shell type indicator filament comprising an inner colored core region and an outer colored shell region the color of the inner core region being different from the color of the outer shell region, and the filament may change its color over a pre-defined period of time by abrasion and/or degradation. Said type of filament maybe a coextruded, i.e. composite filament.

The colored outer shell region may or may not extend along the entire length of the longitudinal outer surface of the filament. For example, the colored region may extend along a portion of the length, such as a portion including the filament tip which is normally subjected to more intense conditions of wear than other portions of the filament. In this case, the color of said portion of the length will change in response to wear and use.

The colored core may be completely surrounded by the outer shell material, e.g. in the form of an annular ring having a color different from the core color. The change in color by abrasion of the outer shell is indicative of the filament wear. The color changing characteristics, i.e. the time period required during normal use until the inner core becomes visible, can be adjusted by the thickness/dimension of the outer shell. The thicker the shell, the longer it takes until the differently colored core becomes visible.

With that technology, an outer shell region with relatively dark and uniform color with a clear line of demarcation of the colored outer shell versus a differently colored core region can be provided.

In other words, the coextruded filament may comprise a longitudinal outer coating layer providing a boundary about the cross-sectional area of the filament and, thus, the cross-sectional area presents a two-colored region adapted to provide a visual signal indicative of wear in response to filament use. The filament can be made from natural or synthetic materials. The colored outer shell region may provide the initial color. As wear is produced by continuing use of the filament, the colored region changes to a point which signals the user that the filament no longer provides the requisite performance characteristics for effectively performing its assigned function. The outer shell region may be a uniform coating around the entire perimeter of the core region.

For filament types changing its color relatively quickly to provide the first color pattern may comprise a shell region extending inwardly into a portion of the overall cross-sectional area of the filament for a distance equivalent to about 10% or less, or to about 5% or less of the filament radius. Filament types changing its color relatively slowly to provide the second or third color pattern may comprise a shell region extending inwardly into a portion of the overall cross-sectional area of the filament for a distance from about 20% to about 10%, or from about 10% to about 15% of the filament radius.

The core may be a reinforcing element and may be relatively hard and stiff to control the rigidity of the filament while the outer cover material may be softer than the core material and is, thus, more susceptible to wear. In use, the cover material becomes worn in the area of the rounded end of the filament and peels or breaks off to expose the core color to signal that the brush should be discarded or discarded soon.

The filaments according to the present disclosure have an overall length extension measured from the free end to the mounting surface of the head. At least one type of filament may change the color only over a portion of said overall length extension, for example over a portion from about ⅓ to about ⅔ of the overall length extension measure from the free end of the filament. The coloring may be slowly worn away in that portion as the filament is used over time to indicate the extent to which the filament is worn.

As used herein the term "colored region" can mean a core or shell material which is colored by a colorant prior to being extruded. It can also mean a core or shell which is made of a plastic with a unique color. Furthermore, transparent or translucent regions are also considered to be "colored" as they are at least of different optical appearance than a truly pigmented or dyed region, as is also the case for a shell/core varying degrees of color intensity. However, it is important that the core and shell materials have visually different color, e.g., white core and blue sheath, transparent core and red sheath, light red core and dark red sheath, etc. Preferred filaments according to the present disclosure comprise a white or transparent core and a dyed or pigmented shell.

The head may further comprise regular filaments (e.g. white filaments) not having any color changing characteristics so that the overall second color pattern may form a substantially uniform white pattern, i.e. comprising white filaments only. Alternatively, the second color pattern may consist of white filaments with one or more center tufts revealing a colored dot, e.g. a yellow dot, thereby providing a signal that the head or the overall toothbrush shall be exchanged/renewed.

At least one type of filament may be made of polyamide, e.g. nylon, with or without an abrasive such as kaolin clay, or polybutylene terephthalate (PBT) with or without an abrasive such as kaolin clay and/or of polyamide indicator material, e.g. nylon indicator material.

The core-shell type of filament may comprise at least two segments of different materials. At least one segment may comprise a thermoplastic elastomer material (TPE) and at least one segment may comprise polyamide, e.g. nylon, with or without an abrasive such as kaolin clay, or a polyester, e.g. polybutylene terephthalate (PBT) with or without an abrasive such as kaolin clay or a polyamide indicator material, e.g. a nylon indicator material, colored at the outer surface. These at least two segments may be arranged in a side-by-side structure or in a core-sheath structure which may result in reduced stiffness of the overall filament. A core-sheath structure with an inner/core segment comprising a harder material, e.g. polyamide or PBT, and with an outer/sheath segment surrounding the core segment and comprising a softer material, e.g. TPE, may provide the filament with a relatively soft outer lateral surface which may result in gentle cleaning properties.

At least one of the filament types may comprise a component selected from fluoride, zinc, strontium salts, flavor, silica, pyrophosphate, hydrogen peroxide, potassium nitrate or combinations thereof. For example, fluoride may provide a mineralization effect and, thus, may prevent tooth decay. Zinc may strengthen the immune system of the user. Hydrogen peroxide may bleach/whiten the teeth. Silica may have an abrasive effect to remove dental plaque and debris more effectively. Pyrophosphate may inhibit the formation of new plaque, tartar and dental calculus along the gum line. A filament comprising pyrophosphate may offer lasting protection against inflammations of the gums and mucous membrane of the mouth.

If a plurality of such filaments is bundled together to form a tuft, they may be arranged in a manner that filaments at the tuft's outer lateral surface may comprise pyrophosphate to inhibit the formation of plaque, tartar and dental calculus along the gum line whereas filaments arranged in the center of the tuft may comprise fluoride to mineralize the teeth during a brushing process.

At least one of the components listed above may be coated onto a shell, i.e. onto an outer segment of a filament. Such filament may make the component(s) directly available to the teeth in a relatively high concentration, i.e. the component(s) may be in direct contact with the teeth during brushing.

At least some of the filaments may be a substantially cylindrical filament, i.e. the filament may have a substantially cylindrical outer lateral surface. In other words, the shape and size of the cross-sectional area of the filament along its longitudinal axis may not vary substantially, i.e. the shape and size of the cross-sectional area may be substantially constant over the longitudinal extension of the filament. In the context of this disclosure the term "outer lateral surface of a filament" means any outer face or surface of the filament on its sides. This type of filament may provide increased bending stiffness as compared to tapered filaments. A higher bending stiffness may further facilitate the filament to penetrate into interdental gaps/spaces. The cylindrical filament may have a substantially end-rounded tip/free end to provide gentle cleaning properties. End-rounded tips may avoid that gums get injured during brushing.

Alternatively, or in addition to the cylindrical filaments described above, at least some filaments may comprise along its longitudinal axis a substantially cylindrical portion and a tapered portion, the tapered portion tapers in the longitudinal direction towards a free end of the filament.

In other words, the filaments may be tapered filaments having a pointed tip. Tapered filaments may achieve optimal penetration into areas between two teeth as well as into gingival pockets during brushing and, thus, may provide improved cleaning properties. The tapered filaments may have an overall length extending above the mounting surface of the head within a range from about 8 mm to about 16 mm, optionally about 12.5 mm, and a tapered portion within a range from about 5 mm to about 10 mm measured from the tip of the filament. The pointed tip may be needle shaped, may comprise a split or a feathered end. The tapering portion may be produced by a chemical and/or mechanical tapering process.

The oral care implement according to the present disclosure may be a toothbrush comprising a handle and a head. The head extends from the handle and may be either repeatedly attachable to and detachable from the handle, or the head may be non-detachably connected to the handle. The toothbrush may be an electrical or a manual toothbrush.

A head for an oral care implement in accordance with the present disclosure may comprise a bristle carrier being provided with tuft holes, e.g. blind-end bores. Tufts according to the present disclosure may be fixed/anchored in said tuft holes by a stapling process/anchor tufting method. This means, that the filaments of the tufts are bent/folded around an anchor, e.g. an anchor wire or anchor plate, for example made of metal, in a substantially U-shaped manner The filaments together with the anchor are pushed into the tuft hole so that the anchor penetrates into opposing side walls of the tuft hole thereby anchoring/fixing/fastening the filaments to the bristle carrier. The anchor may be fixed in opposing side walls by positive and frictional engagement. In case the tuft hole is a blind-end bore, the anchor holds the filaments against a bottom of the bore. In other words, the anchor may lie over the U-shaped bend in a substantially perpendicular manner Since the filaments of the tuft are bent around the anchor in a substantially U-shaped configuration, a first limb and a second limb of each filament extend from the bristle carrier in a filament direction. Filament types which can be used/are suitable for usage in a stapling process are also called "two-sided filaments". Heads for oral care implements which are manufactured by a stapling process can be provided in a relatively low-cost and time-efficient manner To enable provision of tufts of the first type comprising a relatively large cross-sectional area, a plurality of smaller tuft holes can be placed with minimal spacing in close proximity to each other so that a larger overall tuft can be formed.

Alternatively, the tufts may be attached/secured to the head by means of a hot tufting process. One method of manufacturing the head of an oral care implement may comprise the following steps: Firstly, the tufts may be formed by providing a desired amount of filaments according to the present disclosure. Secondly, the tufts may be placed into a mold cavity so that ends of the filaments which are supposed to be attached to the head extend into said cavity. Thirdly, the head or an oral care implement body comprising the head and the handle may be formed around the ends of the filaments extending into the mold cavity by an injection molding process, thereby anchoring the tufts in the head. Alternatively, the tufts may be anchored by forming a first part of the head—a so called "sealplate"—around the ends of the filaments extending into the mold cavity by an injection molding process before the remaining part of the oral care implement may be formed. Before starting the injection molding process, the ends of the at least one tuft extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tuft on the finished head of the oral care implement. In other words, the filaments of the tufts attached to the head by means of a hot tufting process may be not doubled over a middle portion along their length and may be not mounted in the head by using an anchor/staple. The tufts may be mounted on the head by means of an anchor-free tufting process. A hot tufting manufacturing process allows for complex tuft geometries. For example, the tufts may have a specific topography/geometry at its free end, i.e. at its upper top surface, which may be shaped to optimally adapt to the teeth's contour and to further enhance interdental penetration. For example, the topography may be chamfered or rounded in one or two directions, pointed or may be formed linear, concave or convex.

The following is a non-limiting discussion of example embodiments of oral care implements and parts thereof in accordance with the present disclosure, where reference to the Figures is made.

FIG. 1 shows in a schematic manner the staggered time-controlled color changing characteristics of a head 10 for an oral care implement—which could be a manual or an electrical toothbrush—according to an embodiment of the present disclosure. The head 10 comprises a number of colored filaments of different types 12, 14. The filaments are bundled together to form tufts of filaments which extend from a mounting surface 16 of the head 10. The filaments or tufts of filaments are grouped together to define an initial color pattern 20. At least two types of filament 12, 14 have staggered time-controlled color changing properties, wherein each of said type of filament 12, 14 changes its color within pre-defined time periods. Said pre-defined time periods are different from one another so that the initial color pattern 20 changes color characteristics over at least a first pre-defined period of time to a first color pattern 30 and over a subsequent second pre-defined period of time to a second color pattern 40, the second pattern 40 being different from the first pattern 30.

In the example of FIG. 1, the filaments of the first and second type 12, 14 are co-extruded filaments having a core-shell structure of different colors as discussed above. While the first type of filament 12 comprises a relatively small shell structure 21 surrounding the core 23 to provide relatively quick color changing characteristics, the second type of filament 14 has a thicker shell structure 22 surrounding the core 24 so that the color change of said type of filament 14 occurs after the color change of the first type of filament 12. While the first type of filament 12 contributes to the first color change to provide the first color pattern 30 after e.g. at the end of one or two months of regular use, the second type of filament 14 contributes to the second color change to provide the second color pattern 40, e.g. at the end of three months of regular use to indicate that the head or the overall toothbrush has to be discarded.

Figure 2:
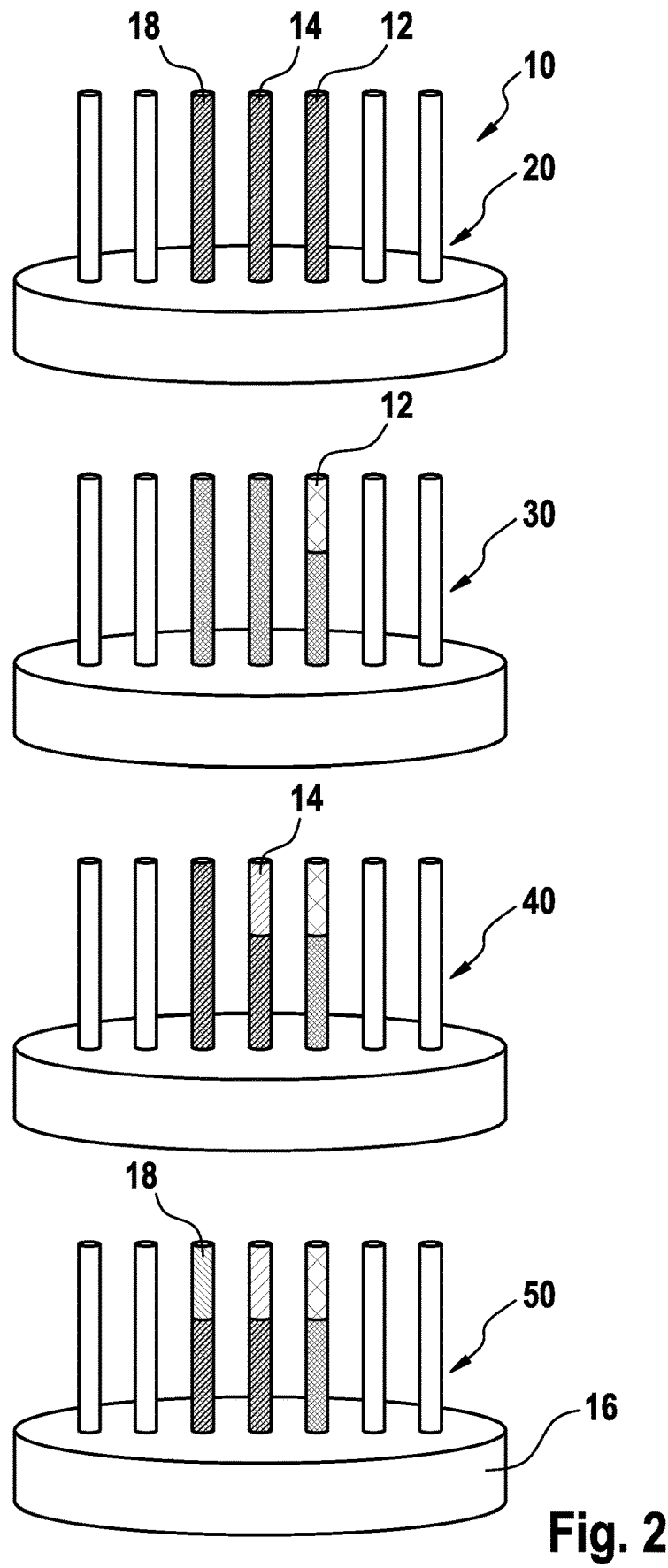
FIG. 2 shows in a schematic manner the staggered time-controlled color changing characteristics of a head according to another embodiment of the present disclosure, starting from an initial color pattern, changing to a first color pattern within a first pre-defined period of time, to a second color pattern within a second pre-defined period of time, and to a third color pattern within a third pre-defined period of time.

FIG. 2 shows in a schematic manner the staggered time-controlled color changing characteristics of a head 10 according to another embodiment of the present disclosure. The embodiment of FIG. 2 is similar to FIG. 1. However, in the embodiment of FIG. 2 a third type of filament 18 is provided in addition to the first and second type of filament 12, 14. Again, while the first type of filament 12 contributes to the first color change to provide the first color pattern 30 after e.g. at the end of one month of regular use, the second type of filament 14 contributes to the second color change to provide the second color pattern 40, e.g. at the end of two months of regular use, and the third type of filament 18 contributes to a third color change to provide the third color pattern 50, e.g. at the end of three months of regular use to indicate that the head or the overall toothbrush has to be discarded. The third color pattern 50 is different from the first and second color pattern 30, 40, and may be provided by a third type of filament 18 having a relatively thick outer shell structure, i.e. a shell being thicker than the shell of the first and second type of filament 12, 14.

Figure 3:
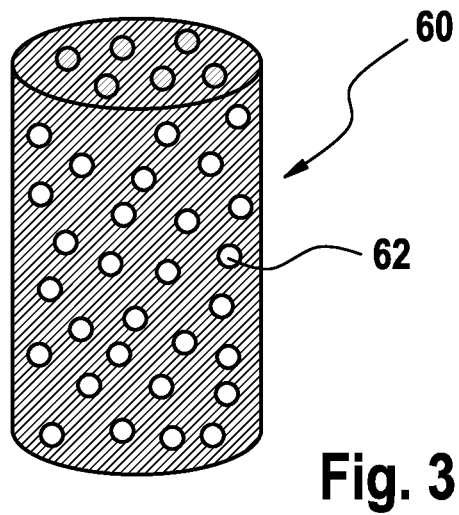
FIG. 3 shows in a schematic manner the base material of a filament according to the present disclosure.
Figure 4:
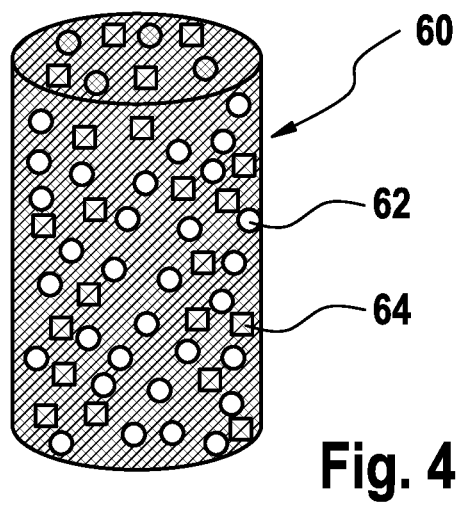
FIG. 4 shows in a schematic manner the base material of FIG. 3, wherein indicator dye is added.
Figure 5:
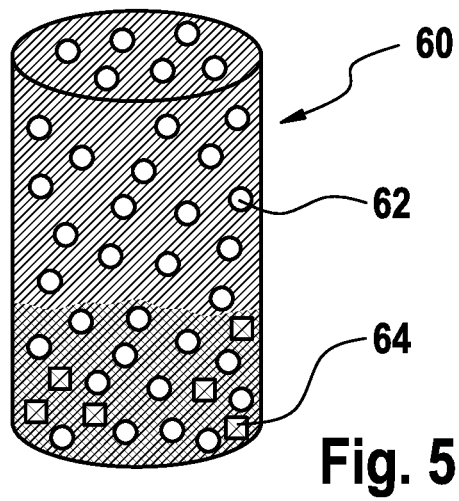
FIG. 5 shows in a schematic manner the filament of FIG. 4 after about three months of use.

FIGS. 3 to 5 show in a schematic manner a monofilament 60 which can be alternatively used in the embodiments according to FIGS. 1 and/or 2.

The filament 60 as shown in FIG. 4 is dyed with combinations of dyes 62, 64—a dye 62 providing the base material with a certain color as shown in FIG. 3, and an indicator dye, preferably being water-soluble, added to said base material (see FIG. 4). Each dye 62, 64 provides a color intensity having a different resistance to change in response to wear and use. in this example, the filament is dyed with two dyes 62, 64 in which the dye of the base material 62 (shown in FIG. 3) is more resistant to change in response to wear and use than the indicator dye 64 which has been added to the base material (FIG. 4). in FIG. 5 it is shown how the color intensity changes in response to wear and use to provide a color intensity which will be predominantly provided by the more resistant dye of the base material 62. For example, the color of the base material 62 of the filament 60 may be blue. The indicator dye 64 being less resistant than the base dye 64 may be yellow (see FIG. 4). If a yellow indicator dye 64 is added to a base material dyed in blue 62, then the overall color impression is green. After a certain period of time the indicator dye 64 fades away and the base material 62 in blue becomes visible to provide a signal that the brush head has to be exchanged or exchanged soon (see FIG. 5).

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A head (10) for an oral care implement, the head (10) comprising a number of colored filaments of different types (12, 14, 18), the filaments (12, 14, 18) extending from a mounting surface (16) of the head (10) and being grouped together to define an initial color pattern (20), at least two types of filament (12, 14) having staggered time-controlled color changing properties, wherein each of said type of filament (12, 14) changes its color within pre-defined time periods, the pre-defined time periods being different from one another so that the initial color pattern (20) changes color characteristics over at least a first pre-defined period of time to a first color pattern (30), and over a subsequent second pre-defined period of time to a second color pattern (40), the second pattern (40) being different from the first pattern (30), wherein a first type of filament (12) changes its color within the first period of time from an initial color to a second color to define the first color pattern (30), a second type of filament (14) changes its color after the first period of time and within the second period of time from an initial color to a second color to define the second color pattern (40), and a third type of filament (18) changes its color after the first and second period of time within a subsequent third period of time from an initial color to a second color to define a third color pattern (50), the third color pattern (50) being different from the first and second color pattern (30, 40).

2. The head of claim 1, wherein the first type of filament (12) further changes its color within the second period of time from the second color to a third color to further define the second color pattern (40).

3. The head of claim 1, wherein the initial color pattern (20) comprises filaments having all the same initial color.

4. The head of claim 1, wherein the second color of the first type of filament (12) is different from the second color of the second type of filament (14).

5. The head of claim 1, wherein the second color of the third type of filament (18) is different from the second color of the first and second type of filament (12, 14).

6. The head of claim 1, wherein at least one type of filament (12, 14, 18) is a monofilament, comprising polyamide and a water-soluble dye colorant selected from the group consisting of a food dye and a dye leaching over at least one of the pre-defined periods of time in response to increased use of the filament, thereby changing the color from an initial color to at least one of a second color and a third color.

7. The head of claim 6, wherein the dye is provided in a colored outer region extending inwardly into a portion of the filament's cross-sectional area for a distance of from about 20% to about 40% of the radius of the filament.

8. The head of claim 7, wherein the filament comprises an inner portion having a dye colorant, wherein the dye colorant of the inner portion is different from the dye colorant of the colored outer region.

9. The head of claim 6, wherein at least another type of filament (12, 14, 18) is a monofilament comprising a water-soluble dye colorant leaching over at least one of the pre-defined periods of time in response to increased use of the filament, thereby changing the color from an initial color to at least one of a second color and a third color, wherein the dye colorant is provided in a colored outer region extending inwardly into a portion of the filament's cross-sectional area for a distance of about 20% or less of the radius of the filament (12, 14, 18).

10. The head of claim 1, wherein at least one type of filament (12, 14, 18) is a core-shell type indicator filament comprising an inner colored core region (23, 24) and an outer colored shell region (21, 22), the color of the inner core region (23, 24) being different from the color of the outer shell region (21, 22), wherein the indicator filament is structured to change its color over a pre-defined period of time by at least one of abrasion and degradation.

11. The head of claim 1, wherein at least one type of filament (12, 14, 18) is a monofilament (60) dyed with a combination of dyes (62, 64), each dye (62, 64) having a color intensity with different resistance to change in response to wear and use.

12. The head of claim 1, wherein the filaments (12, 14, 18) have an overall length extension measured from the free end to the mounting surface, and at least one type of filament (12, 14, 18) changes the color only over a portion of the overall length extension comprising from about ⅓ to about ⅔ of the overall length extension measured from the free end of the filament.

13. An oral care implement comprising the head of claim 1.

* * * * *